United States Patent [19]

Lin

[11] Patent Number: 5,459,527
[45] Date of Patent: Oct. 17, 1995

[54] FILTER SCREEN FOR MONITORS

[76] Inventor: Ta C. Lin, No. 24, Kung Ying I Street, Tainan City, Taiwan

[21] Appl. No.: 274,092

[22] Filed: Jul. 12, 1994

[51] Int. Cl.[6] .............................. H01J 5/16; H01J 31/00; H04N 5/65; H04N 5/72

[52] U.S. Cl. .......................... 348/819; 348/835; 359/601; 359/609; 359/614; 313/112; 313/479; 313/466

[58] Field of Search ...................................... 348/835, 786, 348/819, 818, 823; 313/112, 466, 479, 474, 478; 359/601, 609, 614

[56] References Cited

U.S. PATENT DOCUMENTS

| | | | |
|---|---|---|---|
| 4,468,702 | 8/1984 | Jandrell | 348/819 |
| 4,856,101 | 8/1989 | Jonsson et al. | 348/819 |
| 4,905,089 | 2/1990 | Liang et al. | 348/819 |
| 5,030,882 | 7/1991 | Solero | 348/819 |
| 5,204,750 | 4/1993 | Ferraroni | 348/819 |

Primary Examiner—Edward L. Coles, Sr.
Assistant Examiner—Kimberly A. Williams
Attorney, Agent, or Firm—Jones, Tullar & Cooper

[57] ABSTRACT

A filter screen including a mounting frame mounted on a monitor, a screen glass holder frame pivotally connected to the mounting frame, a conductive screen glass mounted between the front and back shells of the screen glass holder frame and covered over the screen of the monitor, and a radiation alarm and eliminator circuit mounted on the screen glass holder frame and connected to the hot and neutral slots of a power outlet socket by a two-blade plug permitting the radiation of the monitor to be guided by the conductive screen glass to grounding, and wherein the radiation alarm and eliminator circuit has an indicator lamp and a buzzer controlled by an option switch to flash or buzz when the two blades of the plug are not inserted into the hot and neutral slots of the power outlet socket correctly.

1 Claim, 7 Drawing Sheets

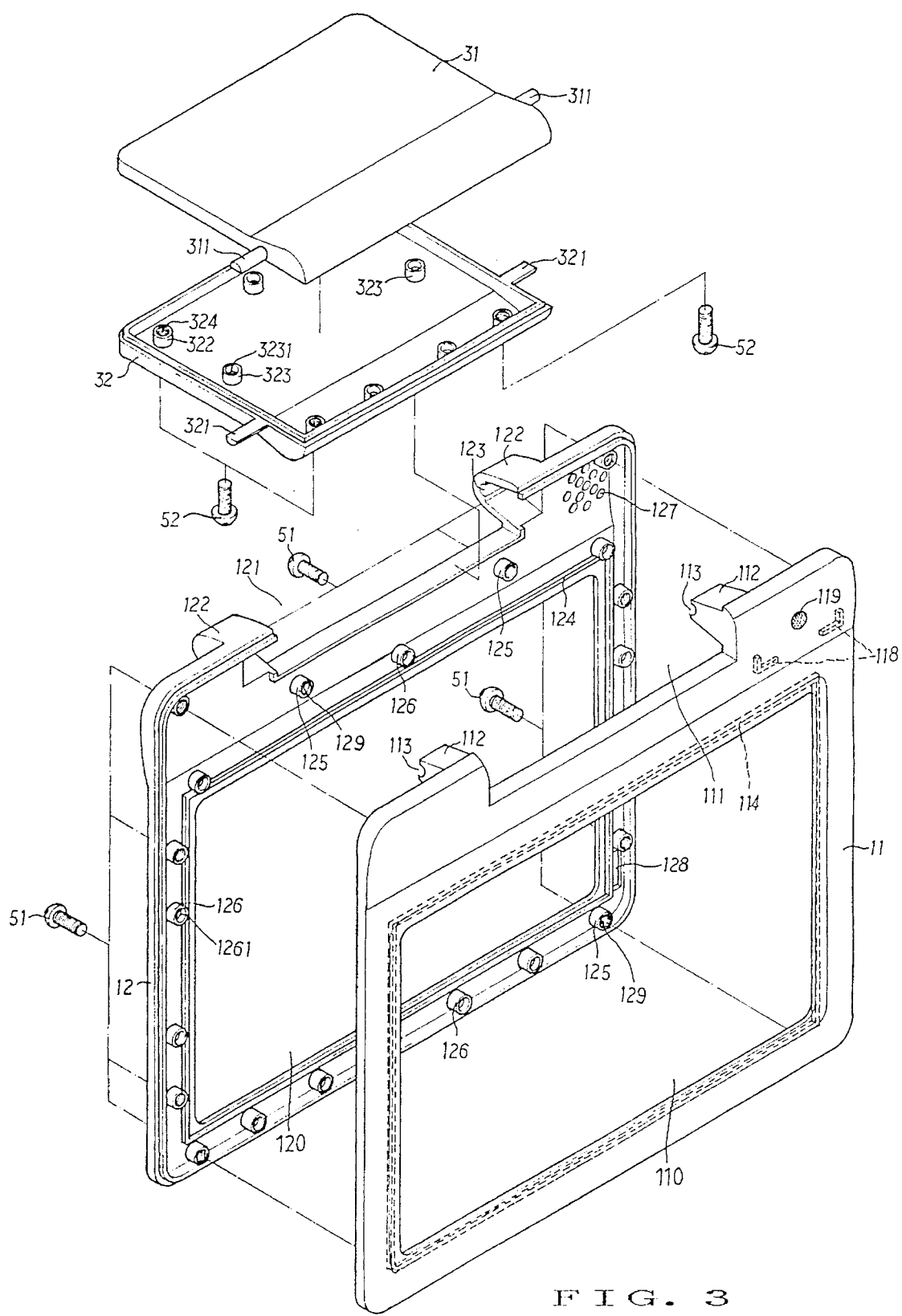
F I G. 3

C-C'

B-B'

D-D'

FILTER SCREEN FOR MONITORS

BACKGROUND OF THE INVENTION

The present invention relates to a filter screen for mounting on a monitor to eliminate the radiation, which automatically drives all indicator lamp to flash and a buzzer to buzz when the plug of the radiation alarm and eliminator circuit is not correctly connected to a power outlet socket.

During the operation of the monitor of a television set, computer or any electronic instrument, radiation is simultaneously released from the screen of the monitor. Various filter screens have been disclosed for eliminating the radiation of monitors. FIG. 1 shows a filter screen according to the prior art, which comprises a hinged frame mounted on the shell of a monitor, a screen glass covered with a conductive layer of meshed wire and mounted within time hinged frame, and a single blade plug 20 connected to the conductive layer of meshed wire of the screen glass and having a blade 201 for insertion into the neutral slot 302 of a power outlet socket 30 permitting time radiation of the monitor to be guided to grounding by the conductive layer of meshed wire of the screen glass. When installed, the user may insert the blade 201 of the single blade plug 20 into the hot slot 301 of the power outlet socket 30 causing the filter screen not to function properly. Furthermore, the hinged frame is fastened to the shell of the monitor by a velcro tape. After long uses, the velcro tape may be deformed by heat. When the velcro tape deforms, the hinged frame may disconnect from the shell of the monitor.

SUMMARY OF THE INVENTION

The present invention has been accomplished to provide a filter screen which eliminates the aforesaid drawbacks. According to one aspect of the present invention, the filter screen comprises a mounting frame mounted on a monitor, a screen glass holder frame pivotally connected to the mounting frame, a conductive screen glass mounted between the front and back shells of the screen glass holder frame and covered over the screen of the monitor, and a radiation alarm and eliminator circuit mounted on the screen glass holder frame and connected to the hot and neutral slots of a power outlet socket by a two-blade plug permitting the radiation or the monitor to be guided by the conductive screen glass to grounding, wherein the radiation alarm and eliminator circuit has an indicator lamp and a buzzer controlled by an option switch to flash or buzz when the two blades of the plug are not inserted into the hot and neutral slots of the power outlet socket correctly.

According to another aspect of the present invention, the mounting frame has two symmetrical pairs of half-round pins matched together at two opposite sides respectively fitted into matched half-round grooves at two opposite sides of a top recess on the screen glass holder frame so that the mounting frame can be turned within 90° angle relative to the screen glass holder frame. When installed, the mounting frame and the screen glass holder frame are retained at right angles, and therefore the filter screen does not disconnect from the shell of the monitor even if the velcro tape on the mounting frame is deformed by heat.

BRIEF DESCRIPTION OF THE DRAWINGS

FIG. 3 is an exploded view of the filter screen shown in FIG. 2;

DETAILED DESCRIPTION OF THE PREFERRED EMBODIMENT

Figure 1:
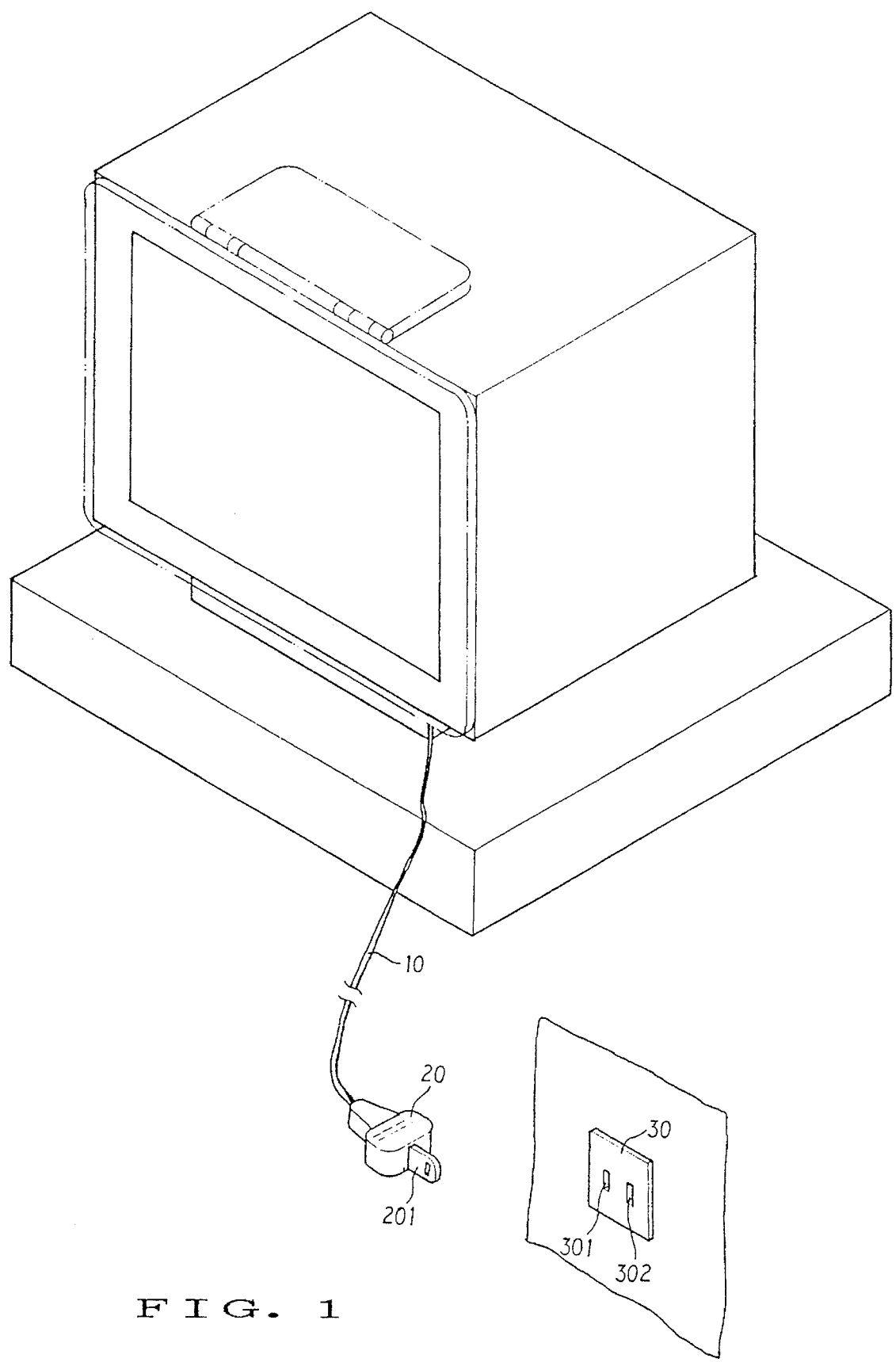
FIG. 1 is an installed view of a filter screen according to the prior art.
Figure 2:
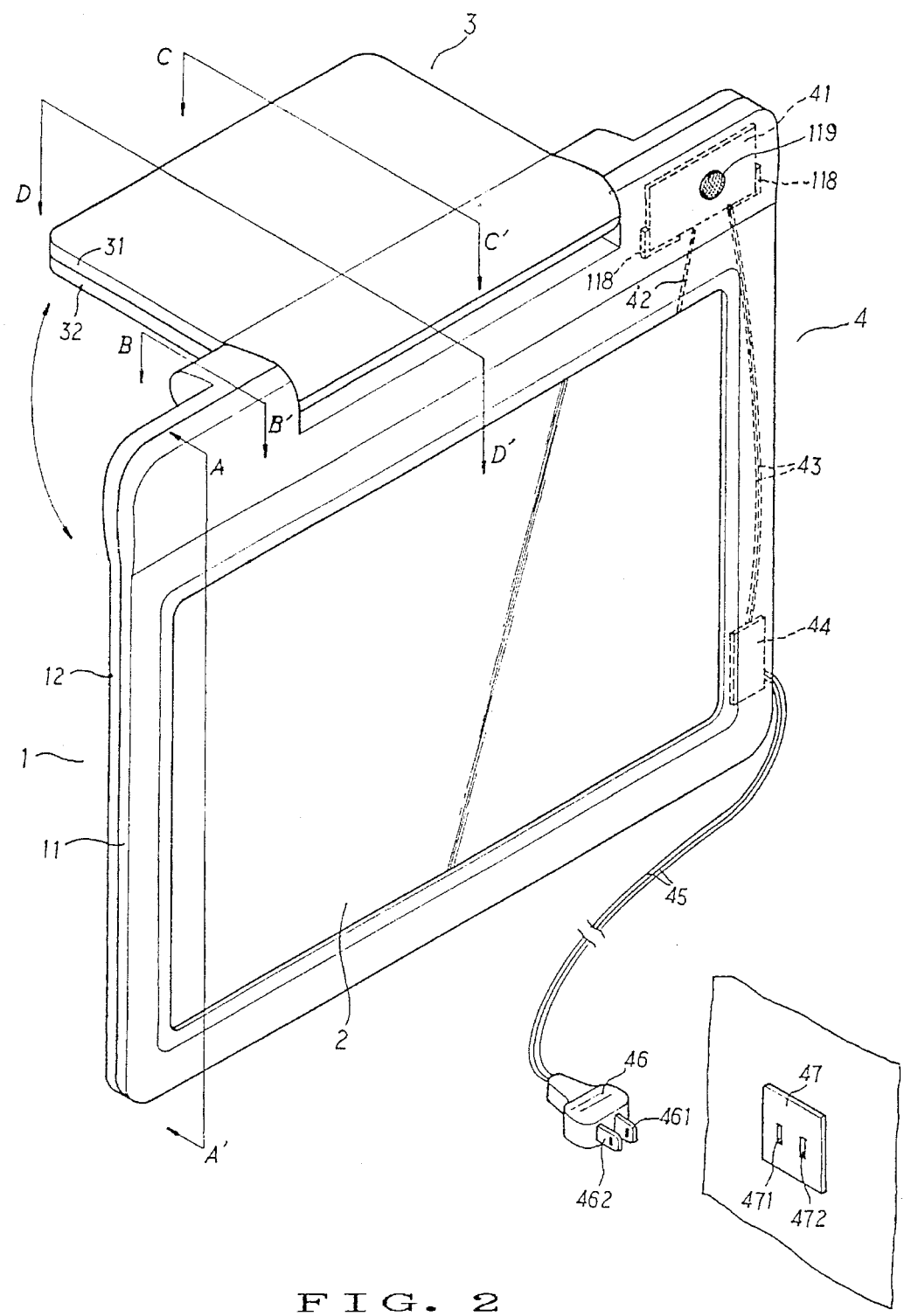
FIG. 2 is an elevational view of a filter screen according to the present invention.

Referring to FIGS. 2 through 7, a filter screen according to the present invention is generally comprised of a screen glass holder frame 1, a conductive screen glass 2, a mounting frame 3, and a radiation alarm and eliminator circuit 4. The screen glass holder frame 1 comprises a front shell 11 and a back shell 12. The mounting frame 3 comprises a top shell 31 and a bottom shell 32.

Figure 4:
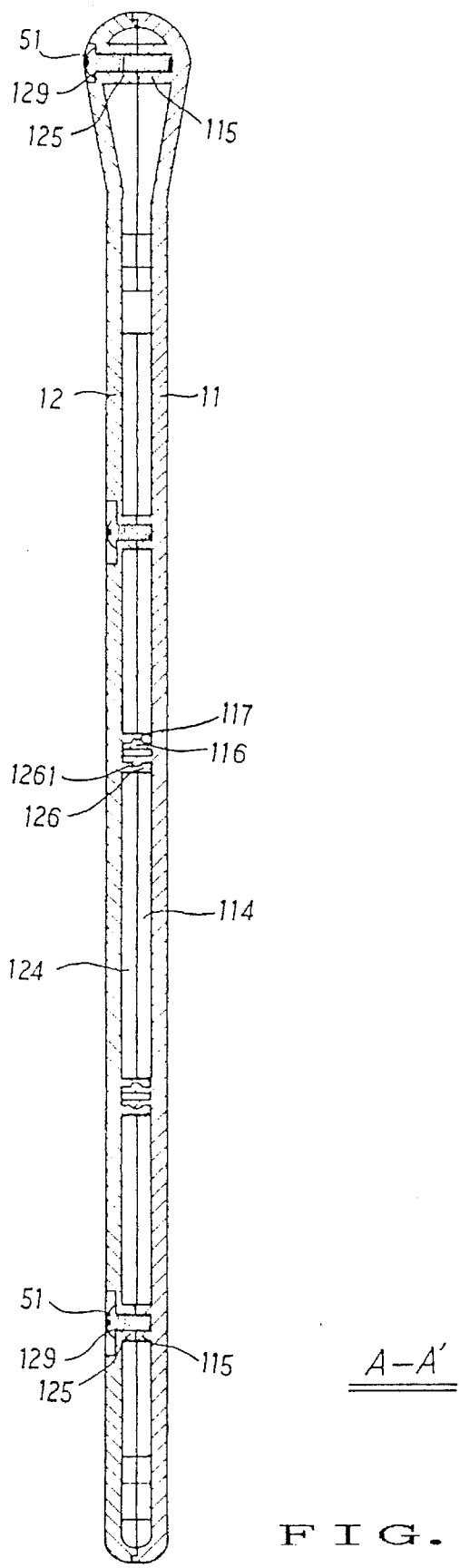
FIG. 4 is a sectional view taken along line A-A' of FIG. 2.
Figure 5:
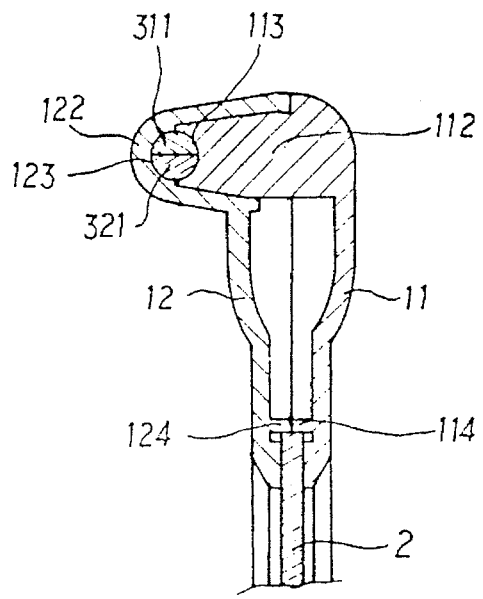
FIG. 5 is a sectional view taken along line B-B' of FIG. 2.

Referring to FIGS. 3, 4, and 5, the front shell 11 comprises an elongated top recess 111 at the top in the middle, two backward lugs 112 perpendicularly extended from the back side at the top and disposed at two opposite sides by the top recess 111 and having a respective half-round groove 113 horizontally aligned, back flange 114 raised from the back side around a center opening 110, a plurality of female screws 115 and a plurality of stub tubes 116 respectively raised from the back side and spaced around the back flange 114, each stub tube 116 having a collar 117 around the outside wall, an indicator lamp 119 disposed in the upper right corner, and a bracket 118 made on the back side around the indicator lamp 119. The back shell 12 comprises an elongated top recess 121 at the top in the middle matched with the top recess 111 on the front shell 11, two axle housings 122 perpendicularly extended from the back side at the top, which receive the backward lugs 112 of the front shell 11 respectively and have a respective half-round groove 123 horizontally aligned and respectively matched with the half-round groove 113 on each backward lug 112 of the front shell 11, a front flange 124 raised from the front side around a center opening 120 and matched with the back flange 114 of the front shell 11, a plurality of female screws 125 and a plurality of stub tubes 126 raised from the front side at locations corresponding to the female screws 115 and stub tubes 116 of the front shell 11, a buzzer 127 disposed in the upper right corner, a plurality of screw holes 129 respectively disposed through the female screws 125, and a slot 128 in the lower right corner. The stub tubes 126 have a respective annular groove 1261 on the inside and are made to receive the stub tubes 116 of the front shell 11. By fitting the backward lugs 112 and stub tubes 116 of the front shell 11 into the axle housings 122 and stub tubes 126 of the back shell 12 permitting the collars 117 of the stub tubes 116 or the front shell 11 to engage the annular grooves 1261 of the stub tubes 126 of the back shell 12 respectively, the screen glass 2 is retained firmly between the back flange 114 or the front shell 11 and the front flange 124 of the back shell 12 (see FIG. 5). When connected, a plurality of first screws 51 are respectively threaded into the screw holes 129 and female screws 125 of the back shell 11 and the female screws 115 of the front shell 11 to fix the front and back shells 11 and 12 together (see FIG. 4).

Figure 6:
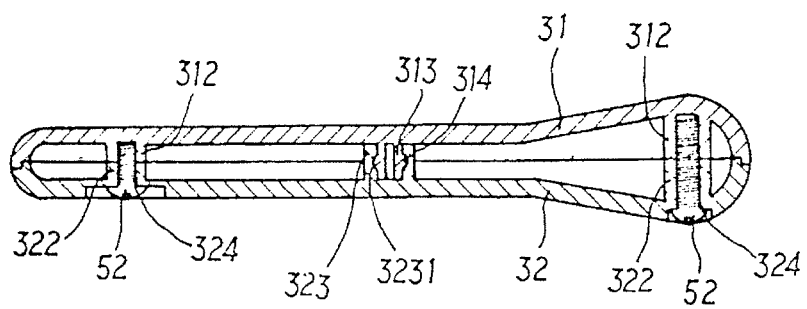
FIG. 6 is a sectional view taken along line C-C' of FIG. 2.

Referring to FIG. 6 and FIGS. 3 and 5 again, the top shell 31 comprises two half-round pins 311 longitudinally aligned at two opposite sides, a plurality of female screws 312 and a plurality of stub tubes 313 perpendicularly extended from the bottom wall. The stub tubes 313 of the top shell 31 have a respective collar 314 around the outside wall. The bottom shell 32 comprises two half-round pins 321 respectively matched with the half-round pills 311 of the top shell 31, a plurality of female screws 322 and a plurality of stub tubes 323 corresponding to the female screws 312 and stub tubes 313 of the top shell 31, and a plurality off screw holes 324 through the female screws 322. The stub tubes 323 of the bottom shell 32 have a respective annular groove 3231 on the inside and are made to receive the stub tubes 313 of the top shell 31. The top and bottom shells 31 and 32 are connected together by: fitting the stub tubes 313 of the top shell 31 into the stub tubes 323 of the bottom shell 32 permitting the collars 314 of the stub tubes 313 of the top shell 31 to engage the annular grooves 3231 of the stub tubes 323 of the bottom shell 32, and then threading a plurality of second screws 52 into the screw holes 324 and female screws 322 of the bottom shell 32 and the female screws 312 of the top shell 31. When the mounting frame 3 is assembled, it is pivotally connected to the screen glass holder frame 1 by inserting the matched half-round pins 311 and 321 into the matched half-round grooves 113 and 123.

Figure 7:
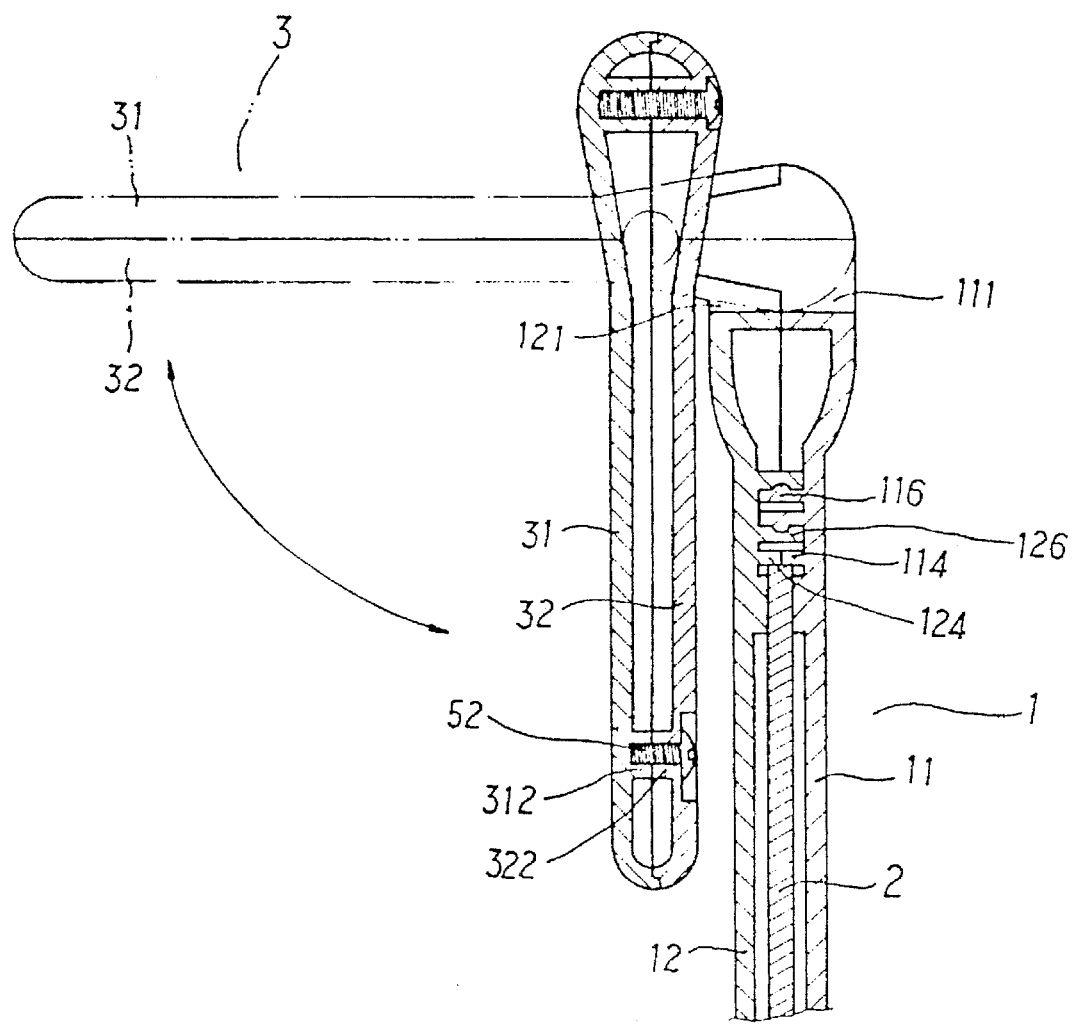
FIG. 7 is a sectional view taken along line D-D' of FIG. 2.

Referring to FIG. 7 and FIG. 2 again, when the mounting frame 3 and the screen glass holder frame 1 are pivotally connected together, the front end of the mounting frame 3 is disposed within the top recesses 111 and 121 of the front and back shells 11 and 12, and therefore the mounting frame 3 can only be turned within 90° angle.

Figure 8:
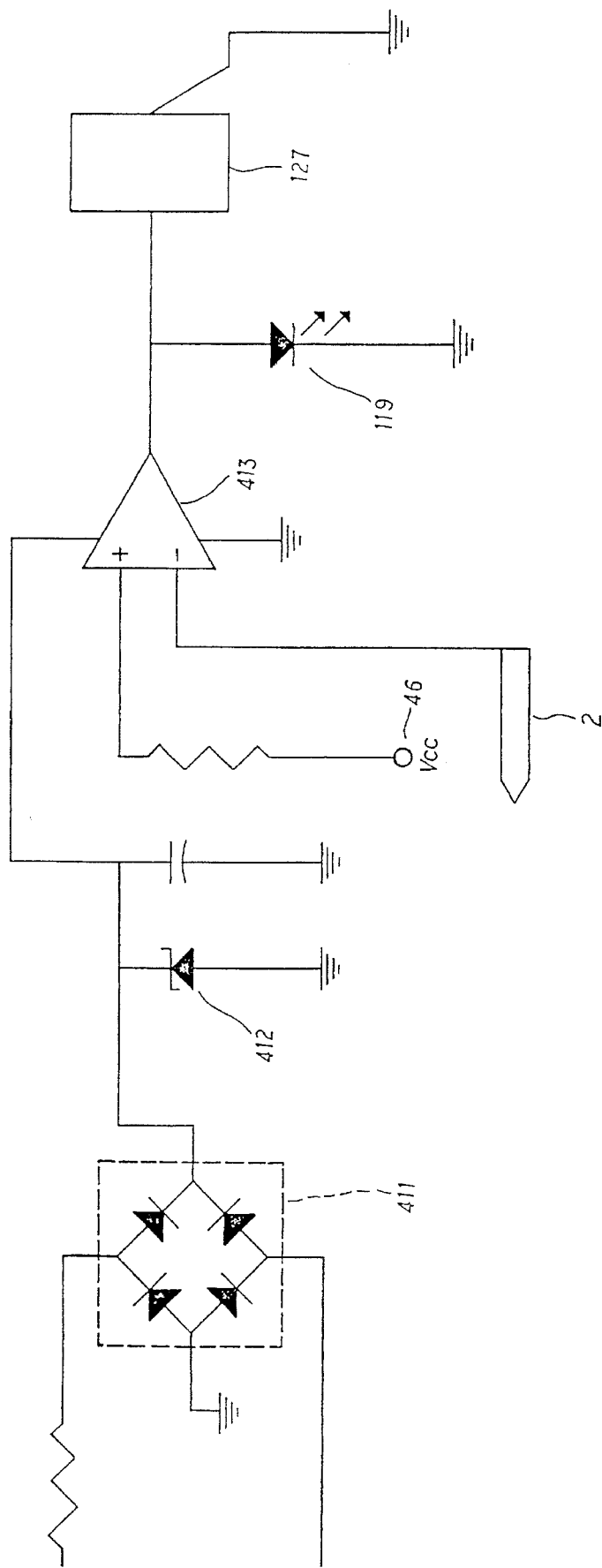
FIG. 8 is a circuit diagram of a radiation alarm and eliminator circuit for a filter screen according to the present invention.

Referring to FIG. 8 and FIGS. 2 and 3 again, the radiation alarm and eliminator circuit 4 comprises a circuit board 41 fixedly mounted on the back side of the front shell 11 and supported on the bracket 118. The circuit board 41 is connected to the conductive screen glass 2 by a conductor 42. The aforesaid indicator lamp 119 and buzzer 127 are respectively electrically connected to the circuit board 41. A receptacle module 44 is mounted on the slot 128 on the back shell 12 and connected to the circuit board 41 by an electric wire 43. A plug 46 is connected to the receptacle module 44 by an electric wire 45. The circuit board 41 comprises a bridge rectifier 411 to rectify AC power supply so as to drop voltage, a zener diode 412 to stabilize voltage from the bridge rectifier 411 so as to provide a stable 12 V DC power supply, and an option switch 413 connected to the zener diode 412 to detect the amount of radiation received by the conductive screen glass 2. When the positive blade 461 and negative blade 462 of the plug 46 are respectively inserted into the neutral slot 472 and hot slot 471 of a power outlet socket 47, the conductive screen glass 2 is actuated to eliminate the radiating waves of the monitor, and at the same time the indicator lamp 119 is turned on to give light, indicating the normal operation of the filter screen. If the positive blade 461 and negative blade 462 of the plug 46 are respectively inserted into the hot slot 471 and neutral slot 472 of the power outlet socket 47, the radiation of the magnetic field produced from the monitor cannot be guided to ground through the grounding wire, and at the same time the indicator lamp 119 flashes and the buzzer 127 buzzes. When the buzzer buzzes, the user is informed to correct the insertion direction of the plug.

The bottom shell 32 of the mounting frame 3 is mounted with a fastening device (not shown) at the bottom so that the mounting frame 3 can be conveniently fastened to the top of a monitor, permitting the conductive screen glass 2 to fit over the screen of the monitor. The fastening device is preferably a velcro tape. When the blades 461 and 462 of the plug 46 are correctly inserted into the neutral and hot slots 472 and 471 of the power outlet socket 47, the indicator lamp 119 is on, and the filter screen works functionally. If the plug 46 is not correctly fastened to the power outlet socket 47, the indicator lamp 119 flashes and, the buzzer 127 buzzes.

Because the mounting frame 3 is pivotally connected to the conductive screen glass holder frame 1 and can be turned relative to the conductive screen glass holder frame 1 within 90° angle, the mounting frame 3 and the screen glass holder frame 1 are disposed at right angles when the filter screen is installed in a monitor. Therefore, the filter screen does not fall from the monitor even if the velcro tape on the bottom shell 32 of the mounting frame 3 does not function well. Another advantage of the present invention is the circuit of the option switch 413, the indicator lamp 119 and the buzzer 127 which prevents error connection between the plug 46 and the power supply circuit.

While only one embodiment of the present invention has been shown and described, it will be understood that various modifications and changes could be made without departing from the spirit and scope of the invention.

What is claimed is:

1. A filter screen comprising a mounting frame mounted on a monitor, a screen glass holder frame pivotally connected to said mounting frame, a conductive screen glass mounted within said screen glass holder frame and disposed in front of the screen of the monitor, and a radiation alarm and eliminator circuit mounted on said screen glass holder frame and connected between said conductive screen glass and a power supply outlet socket permitting the radiation of the monitor to be guided by said conductive screen glass to grounding, wherein:

said screen glass holder frame comprises a front shell and a back shell, said front shell comprising an elongated top recess, two backward lugs perpendicularly extended from a back side thereof at the top and disposed at two opposite sides by the top recess of said front shell and having a respective half-round groove horizontally aligned, a center opening, a back flange raised from the back side around the center opening of said front shell and stopped against said conductive screen glass at the front, a plurality of female screws and a plurality of stub tubes respectively raised from the back side and spaced around said back flange, and a bracket on the back side, each stub tube of said front shell having a collar, said back shell comprising an elongated top recess side matched with the elongated top recess of said front shell, two axle housings perpendicularly extended from a front side thereof at the top, which receive said backward lugs of said front shell and have a respective half-round groove horizontally aligned and respectively matched with the half-round groove on each backward lug, a center opening aligned with the center opening on said front shell, a front flange raised from the front side around the center opening of said back shell and stopped against said conductive screen glass at the back opposite to the back flange of said front shell, a plurality of female screws respectively connected to the female screws on said front shell by screws, a plurality of stub tubes raised from the front side, which receive the stub tubes of said front shell respectively and have a respective annular groove on the inside respectively engaged with the collar on each stub tube of said front shell;

said mounting frame comprises a top shell and a bottom shell, said top shell comprising two half-round pins longitudinally aligned at two opposite sides and respectively fitted into the half-round groove on either backward lug of said front shell, a plurality of female screws and a plurality of stub tubes perpendicularly extended from a bottom wall thereof, each stub tube of said top shell having a collar, said bottom shell comprising two half-round pins respectively matched with the half-round pins of said top shell and respectively fitted into the half-round groove on either axle housing of said back shell, a plurality of female screws raised from a top wall thereof and respectively connected to the female screws of said top shell by screws, and a plurality of stub tubes respectively raised from the top wall, the stub tubes of said bottom shell receiving the stub tubes of said top shell respectively, each stub tube of said bottom shell having an annular groove on the inside engaged with the collar on either stub tube of said top shell;

said radiation alarm and eliminator circuit comprises a circuit board fixedly mounted on the back side of said front shell and supported on said bracket, an indicator lamp mounted on said front shell and connected to said circuit board, a buzzer mounted between said front shell and said back shell and connected to said circuit board, a conductor connected between said circuit board and said conductive screen glass, a receptacle module mounted on said front shell and connected to said circuit board by an electric wire, a two-blade plug connected to said receptacle module for connection to the hot and neutral slots of a power outlet socket, said circuit board comprising a bridge rectifier to rectify AC power supply, a zener diode to stabilize voltage from said bridge rectifier, and an option switch connected to said zener diode to detect the amount of radiation received from the monitor by said conductive screen glass, said option switch giving a signal to said circuit board causing it to drive said indicator lamp to flash and said buzzer to buzz when the blades of said two-blade plug are not inserted into the hot and neutral slots of a power outlet socket in the correction direction.

* * * * *